United States Patent [19]

Harris et al.

[11] Patent Number: 4,994,503

[45] Date of Patent: Feb. 19, 1991

[54] PARTICULATE POLYMER AND POLYMER COMPOSITIONS THEREWITH

[75] Inventors: Robert F. Harris, Midland; Michael R. Savina, Auburn, both of Mich.

[73] Assignee: The Dow Chemical Company, Midland, Mich.

[21] Appl. No.: 406,944

[22] Filed: Sep. 13, 1989

[51] Int. Cl.$^5$ .............................................. C08G 18/14
[52] U.S. Cl. .................................. 521/137; 524/377; 524/762; 525/459; 528/76; 528/80; 528/83; 528/332; 528/336; 528/390
[58] Field of Search ............... 521/137; 524/377, 762; 525/459; 528/76, 80, 83, 332, 336, 390

[56] References Cited

U.S. PATENT DOCUMENTS

| | | | |
|---|---|---|---|
| 4,089,835 | 5/1978 | König et al. | 252/308 |
| 4,374,209 | 2/1983 | Rowlands | 521/116 |
| 4,477,602 | 10/1984 | Liang et al. | 521/137 |
| 4,546,121 | 10/1985 | Haas et al. | 521/164 |

Primary Examiner—Maurice J. Welsh

[57] ABSTRACT

This invention relates to a composition comprising a particulate polymer dispersed in a continuous phase and a process for preparing the particulate polymer. The particulate polymer is characterized in that it is prepared by contacting a polyamine with a carbonyl-containing compound. The particulate polymer dispersions can be used for preparing reinforced polymer matrices, especially where the matrix comprises urethane and/or urea linkages.

The invention allows for the preparation of a particulate polymer without using organic polyisocyanate.

23 Claims, No Drawings

PARTICULATE POLYMER AND POLYMER COMPOSITIONS THEREWITH

FIELD OF THE INVENTION

This invention relates to a particulate polymer and compositions prepared therewith. A process for preparing the particulate polymer and its use in forming compositions, especially stable dispersions suitable for incorporating into other polymer matrices, particularly those comprising urethane and/or urea linkages, is disclosed.

BACKGROUND OF THE INVENTION

Polyurethane polymers, especially foams, with improved mechanical properties (particularly tensile strength and hardness) can be prepared by reacting an organic polyisocyanate with a polyahl composition where at least one component comprises a stable dispersion.

Typically the dispersion consists of a polyurea or polyhydrazo-dicarbonamide which is prepared by reacting a diisocyanate with difunctional primary or secondary amines, hydrazines or hydrazides in polypropylene glycol ethers. Such processes are described in the literature in, for example, U.S. Pat. Nos. 3,325,421 and 4,089,835, German Patent DE 2,513,815 and are extensively reviewed by K. G. Spitler and J. J. Lindsey, *Journal of Cellular Plastics*, Vol. 17, p. 43 (1981). Complementary to these dispersions are those polyisocyanate-derived polyurea dispersions in aromatic polyisocyanates such as disclosed by patent GB 2,127,031.

To date, all polyurea dispersions in either polyether polyols or organic polyisocyanates involve the handling of organic polyisoeyanates in the preparation of the particulate matter of such dispersions. Polyisocyanates are relatively expensive starting materials and also toxic compounds which have to be handled with care.

Accordingly, it would be desirable to provide a process for the preparation of a stable polyurea dispersion which does not involve the use of an organic polyisocyanate. By stable, it is understood that the dispersion can be stored for an extended period, at least 2 weeks, preferably at least one month and up to 6 months, and subjected to normal fluctuations of room temperature without the dispersed particulate polymer agglomerating or solidifying to any significant degree, thus preventing its further use. Some sedimentation of the particulate solid may take place during storage, but this can readily be redispersed on agitation.

It is known that polyhydroxyalkyl monoureas can be synthesized by reacting urea with a polyhydroxylamine as already described in, for example, U.S. Pat. Nos. 3,560,564 and 4,546,121, German Patent 1,463,398, German Offenlegungsschrift 2,703,185 and British Patent 1,127,605. Such prepared monoureas, especially trishydroxyalkyl monoureas, are frequently liquids and form stable liquid dispersions in polyols at room temperature. These dispersions find value as reactive flame-proofing reagents in polyurethane foams.

It is therefore an objective of this invention to develop a discrete particulate polymer and polyahl compositions therewith for improving the mechanical properties of polymer matrices, especially those comprising urethane and/or urea linkages. A further objective is to provide a process for the preparation of such a discrete particulate polymer which does not require the use of an organic polyisocyanate.

SUMMARY OF THE INVENTION

In one aspect, this invention is a stable dispersion of (b) in (a) which comprises
(a) a continuous phase; and
(b) from about 0.1 to about 50 weight percent by total weight of (a) and (b) of a discrete particulate polymer which has an average particle size of about 30 microns or less,
characterized in that (b) is a product containing a plurality of aminocarbonyl moieties or aminothiocarbonyl moieties which is the result of a reaction that comprises contacting
(c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and
(d) one or more polyamines.

In a second aspect, this invention is a process for preparing a particulate polymer containing a plurality of aminocarbonyl moieties or aminothiocarbonyl moieties that comprises contacting
(c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and
(d) one or more polyamines,
at an elevated temperature sufficient to cause the polymerization of (c) and (d) to form the particulate polymer, in a continuous phase in which the particulate polymer is insoluble.

In a third aspect, this invention is a polymer matrix comprising urea and/or urethane linkages which is the product of a reaction that comprises contacting an organic polyisocyanate with an active hydrogen-containing compound characterized in that matrix has dispersed therein a discrete particulate polymer which has an average particle size of from about 30 microns or less, and wherein said particulate polymer is a product containing a plurality of aminocarbonyl moieties or aminothiocarbonyl moieties, and wherein said particulate polymer is the result of a reaction that comprises contacting
(c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and
(d) one or more polyamines.

Surprisingly, it has been found that particulate polymer as described hereinabove can be prepared as a stable dispersion in a continuous phase. The so-prepared particulate polymer can be isolated from the continuous phase and redispersed in the same or different continuous phase to produce a different stable dispersion. The stable dispersion can be used in polymers comprising urea and/or urethane linkages to enhance their physical properties.

DETAILED DESCRIPTION OF THE INVENTION

In one aspect as described hereinabove, this invention is a composition comprising a particulate polymer containing a plurality of aminocarbonyl or aminothiocarbonyl moieties dispersed in a continuous phase.

The composition advantageously contains the particulate polymer in from at least 0.1, preferably at least about 5 and more preferably at least about 8, and up to about 50, preferably up to about 40 and more preferably up to about 30 percent by weight of the total weight of the continuous phase and particulate polymer present.

Compositions that contain lesser or greater amounts of the particulate polymer may not give the desired results in the applications, lead to viscosities too great for processing, or not be stable dispersions.

The particulate polymer can be a variety of shapes and sizes depending on the nature of the starting materials employed in its preparation and the conditions of preparation. The particle shape may be an irregular and amorphous shape or well defined needles or spheres. The particle size and shape can readily be observed by conventional techniques such as, for example, electron microscopy. Advantageously, in its largest aspect, the particle has an average size of about 30 microns or less, preferably about 25 microns or less and more preferably about 15 microns or less. When particulate polymers are prepared where the average particle size is in excess of these values they may not provide for compositions which are stable dispersions or they may not provide for the desired physical properties in an end application.

Again, depending on the starting materials employed, conditions of preparation or subsequent blending with other, similarly defined, particulate polymer, the composition may contain a multi-modal particle size distribution. The multi-modal size distributions may be bi-modal or tri-modal with one or a variety of particle shapes.

The particulate polymer is further characterized in that it contains a plurality of aminocarbonyl or aminothiocarbonyl moieties or mixtures thereof selected from the group consisting of urea, biuret, amide, thiourea, dithiobiuret and thioamide. The particulate polymer preferably contains a plurality of urea, amide and biuret groups, with urea being the most preferred. By the term plurality, it is understood that the particulate polymer contains on average more than one of such aminocarbonyl or aminothiocarbonyl moieties and at least two such aminocarbonyl or aminothiocarbonyl moieties.

The continuous phase can comprise one or more compounds in which the particulate polymer will form a stable dispersion at ambient conditions.

By "stable dispersion" it is understood that the particulate polymer in the continuous phase will not agglomerate in, or cause to solidify, the composition to any significant degree thus preventing its further use in a desired application. Advantageously, the dispersion is stable for at least 2 weeks, preferably at least 4 weeks, and more preferably at least 12 weeks.

The particulate polymer advantageously should not have any inherent reactivity with respect to the continuous phase. Advantageously, the continuous phase is a liquid at ambient temperature, but it can also be a meltable solid such as a thermoplastic polymer.

When the continuous phase is a liquid, the preferred liquids are those as discussed later when defining the continuous phase employed in the process of preparing the particulate polymer. The more preferred continuous phases for the composition are polyahls, such as a polyether polyol, a polyester polyol, a polycarbonate polyol: or mixtures thereof. Especially preferred as continuous phase are polyether polyols because of their suitability to preparing polymer matrices containing urethane and/or urea linkages. A polyether polyol which has from nominally two to about four isocyanate-reactive hydrogen atoms per molecule and a hydroxyl equivalent weight of at least 500, and preferably from about 500 to about 2500, is the most preferred continuous phase for the polymer composition.

The continuous phase of the composition can be that used in a preferred process of preparing the particulate polymer, whereby the particulate polymer is formed and dispersed in situ. In this instance, the polymer composition is a product obtained directly from a process of preparing the particulate polymer in a continuous phase, and the particulate polymer content of the composition is as obtained from the process.

When a composition containing a lower weight percentage of particulate polymer than provided for by the in situ process is desired, this may be achieved by blending in additional amounts of a continuous phase. The additional amounts of continuous phase can be either the same continuous phase as used in the preparation of the particulate polymer, or another continuous phase which is miscible with the first and compatible with the intended end use of the composition.

Compositions containing the particulate polymer at a higher weight percentage than obtained by the in situ process can be prepared by removal of some of the continuous phase through a suitable procedure such as, for example, distillation.

Alternatively, the particulate polymer may be isolated from the continuous phase of the process of its preparation by, for example, filtration, and then blended and redispersed in a continuous phase at a desired and weight content to give a stable dispersion. In this case, such continuous phases for the redispersion of the particulate polymer may be completely different from that used in the process of making the particulate polymer Exemplary of completely different continuous phases for redispersion are thermoplastic polymers or organic polyisocyanates.

When the stable dispersion of the invention is prepared where the continuous phase is different from that used in the process of making the particulate polymer or where the concentration of the particulate polymer is different from that obtained in its process, it may be advantageous to employ a stabilizing agent.

When employed, the stabilizing agent is present in a quantity sufficient to provide for a stable dispersion in a continuous phase. Advantageously, such quantity is less than about 5.0, preferably less than about 3.0 and more preferably less than about 1.0 percent by weight of the combined weights of the continuous phase and particulate polymer present.

Suitable stabilizing agent are those as mentioned later when discussing the process of preparing the particulate polymer.

As already stated, in a second aspect, this invention is a process for preparing a particulate polymer containing a plurality of aminocarbonyl moieties or aminothiocarbonyl moieties selected from the group consisting of urea, biuret, amide, thiourea, dithiobiuret and thioamide which is the result of a reaction that comprises contacting (c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and (d) one or more polyamines.

The particulate polymer is prepared by contacting reactant (c), a carbonyl-containing or thiocarbonyl-containing compound with reactant (d), a polyamine, at an elevated temperature sufficient to cause the polymerization of (c) and (d) resulting in a particulate polymer. The polymerization is effected in a continuous phase in which the particulate polymer is preferably substantially insoluble at ambient temperature. By "substantially insoluble" it is meant that the solubility of the polymer having a plurality of aminocarbonyl or aminothiocarbonyl moieties is such that phase separation occurs resulting in the appearance of "solid", particulate polymer. If the temperature of the continuous phase is too high or too low and/or the concentration of the particular polymer material insufficient, then phase separating may not be observed. Optionally, the continuous phase contains, if required, an effective amount of a stabilizing agent.

Suitable carbonyl-containing and thiocarbonyl-containing compounds for this invention include, for example, a urea compound, a biuret compound, a polycarboxylic acid compound and its ester or anhydride, a polycarboxylic acid chloride, a thiourea compound, a dithiobiuret compound, a polythiocarboxylic acid or its ester or anhydride, a polythiocarboxylic acid chloride, and mixtures thereof.

Urea compounds suitable for use in this invention include urea, methyl urea, ethyl urea, n-butyl urea, 1,3-dimethyl urea, 1,1-dimethyl urea, 1,3-diethyl urea, 1-methyl-1-ethyl urea, 1,1-dibutyl urea, 1,3-dibutyl urea, n-hexyl urea, phenyl urea and diphenyl urea. Urea is the more preferred urea compound.

Thiourea compounds suitable for use in this invention include thiourea, methyl thiourea, ethyl thiourea, n-butyl thiourea, 1,3-dimethyl thiourea, 1,1-dimethyl thiourea, 1,3-diethyl thiourea, 1-methyl-1-ethyl thiourea, 1,1-dibutyl thiourea, 1,3-dibutyl thiourea, n-hexyl thiourea, phenyl thiourea and diphenyl thiourea. Thiourea is the more preferred thiourea compound.

Biuret compounds suitable for use in this invention include biuret, thiobiuret, dithiobiuret, 1-methyl biuret, 1,5-dimethyl biuret, 1-ethyl biuret, 1,1-dimethyl biuret, 1-methyl-5-ethyl biuret, 1-hexyl biuret, phenyl biuret and diphenyl biuret. Biuret is the more preferred biuret compound.

A wide variety of aliphatic, cycloaliphatic, aromatic and/or heterocyclic materials are suitable as carboxylic acid compounds, as are their esters, anhydrides and/or acid chlorides. Such materials include succinic acid, adipic acid, suberic acid, azelaic acid, sebacic acid, phthalic acid, isophthalic acid, terephthalic acid, trimellitic acid, maleic acid, fumaric acid, dimethyl adipate, diethyl adipate, dimethyl subacate, diethyl succinate, dimethyl phthalate, dimethyl terephthalate, succinic anhydride, phthalic anhydride, tetrahydrophthalic anhydride, hexahydrophthalic anhydride, glutaric anhydride, maleic anhydride, tetrachlorophthalic anhydride, phthaloyl chloride, isophthaloyl chloride, terephthaloyl chloride, adipoyl chloride, succinyl chloride and suberoyl chloride.

The most preferred carbonyl-containing compounds for use in this invention are urea and biuret.

Suitable polyamine compounds for this invention include polyamines which comprise at least two amino groups that can independently be primary or secondary amine groups. Preferably, the polyamine contains two such amine groups and hence are diamine compounds. Advantageously, the amine groups of the polyamine are primary amine groups as these are more reactive to the carbonyl-containing compound when preparing the particulate polymer. Suitable polyamines comprise aliphatic, araliphatic, cycloaliphatic or aromatic amines, polyaminated polyether polyols, or mixtures thereof.

Advantageously, when the polyamine is an aliphatic, araliphatic, cycloaliphatic or aromatic amine it has a molecular weight of from about 60 to about 3000, preferably from about 60 to about 1000, and more preferably from about 60 to about 500.

When the polyamine is a polyaminated polyether polyol, advantageously it has a molecular weight of at least about 100, preferably at least about 200, and more preferably at least about 400, but less than about 3000, preferably less than about 2000 and more preferably less than about 1000.

Preferred polyamines for preparing the particulate polymer are diamines and include the aliphatic diamines especially $C_{4-12}$ aliphatic diamines, aromatic diamines, and diaminated polyether polyols.

In a more preferred embodiment of the invention, when the continuous phase is a polyether polyol the polyamine reacting with the carbonyl-containing compound comprises a combination of a $C_{4-12}$ aliphatic diamine or aromatic diamine with a diaminated polyether polyol. In such a preferred combination the aminated polyether polyol may represent up to about 80 weight percent of the total polyamine reacting with the carbony-containing compound. Use of larger quantities of aminated polyether polyol may confer solubility of the particulate polymer depending upon the aliphatic or aromatic amine present.

Specific examples of suitable polyamines include butylenediamine, pentylenediamine, 2-methyl-1,5-pentanediamine, hexamethylenediamine, dodecamethylenediamine, trimethyldiaminohexane, 2,2'-bis-aminopropylmethylamine, diethylenetriamine, triethylenetetraamine and tetraethylenepentamine, dipropylenetriamine, piperazine, N,N'-bis-aminoethylpiperazine, triazine, 4-aminobenzylamine, 4-aminophenylethylamine, 1,4-diaminocyclohexane, phenylenediamines, naphthylenediamines, condensates of aniline and formaldehyde such as methylenediphenylamine including bis(4-aminophenyl)methane, toluenediamine, bisaminomethylbenzenes and the derivatives of the above-mentioned aromatic amines monoalkylated in one or both nitrogen atoms, and mixtures thereof. The preferred $C_{4-12}$ aliphatic diamines and aromatic diamines include butylenediamine, hexamethylenediamine, dodecamethylenediamine, methylenediphenylamine, bis(4-aminophenyl)methane and toluenediamine. Especially preferred is butylenediamine, hexamethylenediamine, methylenediphenylamine, bis(4-aminophenyl)methane and toluenediamine.

The $C_{4-12}$ aliphatic diamines may contain minor quantities of $C_{2-3}$ diamines. Such minor quantities are less than 5, preferably less than 3, more preferably less than 1 percent by weight, and most preferably such $C_{2-3}$ diamines are absent.

The presence of such $C_{2-3}$ diamines in quantities greater than these may deter from the efficient preparation of the particulate polymer.

Aminated polyether polyols may be prepared by reductive amination procedures. Suitable procedures for the reductive amination of polyols are described in, for example, U.S. Pat. Nos. 3,128,311; 3,152,998; 3,236,895; 3,347,926; 3,654,370; 4,014,933; and 4,153,581, the relevant portions of which are herein incorporated by reference.

Exemplary of such aminated polyether polyols are those products sold under the tradename of Jeffamine ™ by Texaco such as Jeffamine ™ D-230 and Jeffamine ™ D-400 which are aminated polyoxypropylene polyols that have molecular weights of about 200 and about 400, respectively.

The equivalent ratio of carbonyl-containing or thiocarbonyl-containing compound to polyamine compound is such so as to provide a particulate polymer which has a plurality of the hereinabove described aminocarbonyl or aminothiocarbonyl moieties. Advantageously an equivalent ratio of carbonyl-containing compound to polyamine of at least about 0.8:1, preferably 0.8:1 to about 1.1:1 based on total amount of carbonyl-containing compound and polyamine charged is employed.

The carbonyl-containing compound is contacted with the polyamine in a continuous phase. Suitable continuous phase materials are those which permit the formation of the particulate polymer and in which the so-formed particulate polymer is substantially insoluble. Exemplary of suitable continuous phases are those products which have boiling points equivalent to or greater than the temperature required for polymerization reaction and include aromatic hydrocarbons, aromatic ethers, alcohols, diols; and polyahls such as a polyether polyol, a polyester polyol, a polycarbonate polyol; or mixtures thereof. When a polyahl is employed as the continuous phase, the active hydrogen groups associated with the polyahl are advantageously less reactive towards the carbonyl-containing compound than the polyamine present. Polyahls are preferred as the continuous phase.

Suitable polyahls for use as the continuous phase in the preparation of the particulate polymers of this invention are those which contain from nominally about two to about eight, and preferably from nominally about two to about four isocyanate-reactive hydrogen atoms per molecule.

Advantageously, the equivalent weight of the polyahl is at least about 31, preferably at least about 100, more preferably at least about 500 and most preferably at least about 1000, but less than about 4000, preferably less than about 2500 and more preferably less than about 2000.

Polyether polyols suitable for use as the continuous phase may be obtained in known manner by reacting initiator compounds containing reactive hydrogen atoms with alkylene oxides, such as ethylene oxide, propylene oxide, butylene oxide, styrene oxide, tetrahydrofuran or epichlorohydrin, or with mixtures of these alkylene oxides. The initiator may be reacted with mixtures of alkylene oxides in either a random or block sequence.

Suitable initiator compounds containing reactive hydrogen atoms include water, ethylene glycol, 1,2- or 1,3-propylene glycol, 1,4- or 2,3-butylene glycol, 1,6-hexanediol, 1,8-octanediol, 4-bis-hydroxylmethyl cyclohexane, 2-methyl-1,3-propanediol, glycerine, trimethylolpropane, 1,2,6-hexanetriol, 1,2,4-butanetriol, trimethylolethane, pentaerythritol, mannitol, sorbitol, methyl glucoside, sucrose, resorcinol, ammonia, methylamine, ethylene diamine, diethylene triamine, tetra- or hexamethylene diamine, ethanolamine, diethanolamine, triethanolamine, aniline, aniline diamine, 2,4- and 2,6-diaminotoluene and polyphenylpolymethylene polyamines of the type obtained by condensing aniline with formaldehyde, and such like materials.

Polyester polyols suitable for use as the continuous phase in this present invention include reaction products of polyhydric (preferably dihydric and, optionally, trihydric) alcohols with polybasic, preferably dibasic, carboxylic acids. Alternatively, to the use of free polycarboxylic acids, it is possible to use the corresponding polycarboxylic acid anhydride or corresponding polycarboxylic acid esters of lower alcohols or mixtures thereof for producing the polyesters. The polycarboxylic acids may be aliphatic, cycloaliphatic, aromatic and/or heterocyclic and may be substituted (for example by halogen atoms) and/or unsaturated. Examples of suitable carboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, oleic acid, maleic acid anhydride, fumaric acid, dimeric and trimeric fatty acids optionally in admixture with monomeric fatty acids, terephthalic acid dimethyl ester and terephthalic acid-bis-glycol ester. Examples of suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, trimethylolethane, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones such as e-caprolactam, or hydroxy carboxylic acids such as ω-hydroxycaproic acid may also be used.

Suitable polycarbonate polyols for use in the process of preparing particulate polymers and compositions of this invention are those compounds which are described in, for example, U.S. Pat. No. 4,686,276 incorporated herein by reference.

The use of polyether polyols as the continuous phase is preferred, especially when such polyols contain predominant amounts of polymerized ethylene oxide and/or primary hydroxyl groups. By "predominant" it is meant that the polyol contains at least 35, preferably at least 50, and more preferably at least 60 percent primary hydroxyl groups of its total hydroxyl group. Polyether polyols are generally less reactive towards amines than polyester or polycarbonate polyols.

When particulate polymer dispersions in a polyester polyol or polycarbonate polyol continuous phase are desired, it is preferable to isolate a particulate polymer prepared in some other continuous phase and redispersed in a polyester polyol or polycarbonate polyol.

However, polyester and polycarbonate polyols may be employed as continuous phase for preparation of the particulate polymer when their relative reactivity is such that they do not significantly participate in the reaction of forming the particulate polymer.

As mentioned hereinabove, the polymerization reaction takes place in the continuous phase which, optionally, contains a stabilizing agent. The stabilizing agent serves to stabilize the particulate polymer and permits the formation of a stable dispersion in the continuous phase. Depending on the carbonyl-containing compound, polyamine and continuous phase employed in preparing the particulate polymer composition of the invention, a stabilizing agent may or may not be required, but advantageously is present.

A stabilizing agent provides a chemical and/or physical means of compatibilizing the particulate polymer with the continuous phase, allowing for the formation of a stable dispersion. The stabilizing agent may be an interreactive stabilizing agent and contain a reactive functional group which can participate in the chemistry associated with the formation of the particulate polymer. Alternatively, the stabilizing agent may be a non-interreactive stabilizing agent containing no interreactive functional group and operate by providing for physical compatibility or miscibility of particulate polymer and continuous phase. When the particulate polymer is stabilized in the continuous phase by a stabilizing agent which has a functional group that can participate in the formation of the particulate polymer the remaining, pendant, part of the stabilizing agent advantageously is compatible with the continuous phase.

Stabilizing agents which interact with the formation of the particulate polymer are amine and carboxylic acid compounds, particularly monoamine and monocarboxylic acid compounds. The monoamine and monocarboxylic acid compounds are advantageously high molecular weight compounds of similar composition to the continuous phase employed when preparing the particulate polymer. Advantageously, the molecular weight of such a monoamine or monocarboxylic acid stabilizing agent is at least 400, preferably at least 1000, more preferably at least 2000, and most preferably at least 4000.

Exemplary of interreactive stabilizing agents which are nominally monoamine compounds are Texaco M-2005 (an aminated 2-methoxyethanol-initiated propylene oxide adduct which has a molecular weight of about 2000); and products which can be obtained by reductive amination of available polyether polyols. A commercially available polyether polyol is, for example, the polyether triol, Voranol TM 4701 sold by The Dow Chemical Company which can be subjected to reductive amination giving a product which has a molecular weight of about 5000 and on average about 30 percent of its hydroxyl groups converted to amine groups, and is therefore nominally a monoamine.

When required, the use of interreactive stabilizing agents is preferred.

A sufficient quantity of stabilizing agent is employed in the process to provide the particulate polymer as defined by the invention. Advantageously, the quantity of stabilizing agent employed is at least about 0.1, preferably at least about 5.0, more preferably at least about 10.0 and most preferably at least about 15.0, but less than about 30.0 percent by weight of total weights of (c) the carbonyl-containing compound, and (d) the polyamine used in preparing the particulate polymer. The above quantities of stabilizing agent are present in the continuous phase in less than about 5.0 percent, preferably less than about 3.0 percent, and more preferably less than about 1.0 percent by weight of the total weight of the continuous phase and stabilizing agent.

The quantities of reactants, polyamine and carbonyl-containing compound, in relation to continuous phase and optional stabilizing agent used in the process of preparing the particulate polymer, are such so as to provide a discrete particulate polymer in the continuous phase. Advantageously, the quantities of reactants and reaction conditions are such to provide an end product from the process which contains the particulate polymer in from at least 0.1, preferably at least about 5 and more preferably at least about 8, and up to about 50, preferably up to about 40 and more preferably up to about 30 percent by weight of the total weight of the continuous phase and reactants employed.

To prepare the particulate polymer, the continuous phase and optional stabilizing agent are advantageously introduced into a suitable reactor preferably padded with an inert atmosphere such as nitrogen. The polyamine and carbonyl-containing compound to be polymerized can be fed into the charged reactor in one or in a multiple of steps before and during the polymerization reaction. They may be fed as a premixed combination or independently.

An advantage of using a multiple step procedure is that it allows for the formation of an intermediate product. The intermediate product, if desired, can be retained and subsequently used in other preparations, covered by the scope of the invention, where variables such as reactants, continuous phase or reaction conditions differ, thus giving the possibility of preparing particulate polymers having mixed compositions and/or specifically controlled particle size(s) and range(s).

To effect the polymerization of the polyamine with the carbonyl-containing compound, it is necessary to heat the contents of the reactor. The temperature needs to be sufficient to promote polymerization without being harmful to the process, reactants or products. The required reaction temperatures will be dependent on te nature of the reactants and continuous phase. Advantageously, an elevated temperature of at least about 50° C., preferably at least about 80° C. and more preferably at least about 100° C., and up to about 200° C., preferably up to about 175° C., more preferably up to about 150° C. and most preferably up to about 120° C. is employed. Use of different carbonyl-containing compounds to prepare the polymer can influence the preferred temperature ranges for operating the process. When the carbonyl-containing compound to be reacted is urea then advantageously the reaction temperature is from about 100° C. to about 175° C. When the carbonyl-containing compound is biuret then advantageously the reaction temperature is from about 50° C. to about 120° C.

The contents of the reactor are maintained at the elevated temperature with continuous stirring until the polymerization reaction is terminated. In the case when reacting urea with a polyamine, the reaction is terminated when ammonia ceases to be evolved, or when the amine concentration (from the polyamine) as measured by, for example, titrometric procedures is seen to be constant with time. Typically, it may take up to 30 hours to reach a state of termination, but this is dependent on the type of reactants, temperature and continuous phase employed.

Although not critical to the formation of the particulate polymer, the rate or type of stirring may influence the particle size and the size distribution. High stirring rates under high shear conditions can favor the production of particulate polymer with smaller particle sizes.

If desired, the pressure within the reactor can be reduced below one atmosphere to promote the polymerization reaction. At reduced pressures, reaction by-products such as ammonia, when urea or biuret are employed, or water when a polycarboxylic acid compound is used as the carbonyl-containing compound, or a lower alcohol when polycarboxylic acid esters of a lower alcohol is used as the carbonyl-containing compound, can readily be removed encouraging formation of desired product.

If required, catalysts may be used to promote the polymerization reaction. Suitable catalysts are any basic compound which is compatible with the polymerization reaction, reactants and products, and include for example, sodium hydroxide, potassium hydroxide and tertiary amines such as triethylamine or N-methyl pyrrolidine. Metal salts are also useful catalysts when polycarboxylic acid esters of lower alcohols are used as the carbonyl-containing compound. Such catalysts include, for example, dibutyltin oxide, zinc oxide and titanium isopropoxide. When used, such catalysts are present in a catalytic quantity sufficient to obtain the desired increase in rate of polymerization.

Advantageously, when present, the quantity of catalyst is less than about 2 percent, preferably less than about 1 percent and more preferably less than about 0.5 percent by weight of total weights of components (c), (d) and continuous phase employed in the process.

When the polymerization reaction is terminated, the product obtained is a particulate polymer dispersed in a continuous phase. The particulate polymer as a stable dispersion may be used directly in a desired application, if the continuous phase is compatible to that application.

In some preparations, the continuous phase may contain quantities of non-polymerized reactants, especially polyamine. The presence of such unreacted polyamine leads to the presence of amino moieties which are not desirable if the continuous phase part of the dispersion is to be used directly in the preparation of, for example, polyurethane polymer matrices. Amine moieties containing hydrogen on the nitrogen center can react with isocyanates. In addition, amine compounds can also function as catalyst in the formation of polyurethane polymer and therefore their presence may present problems with respect to processing and reactivity.

The presence of unreacted amine moieties from the polyamines and any intermediate reaction products can be determined by suitable acid-base titration procedures. They can be removed from the continuous phase by treating with an appropriate quantity of the carbonyl-containing compound under the conditions of polymerization. Alternatively, or in addition to this treatment, if required, any remaining amount of unreacted amine moieties can be removed by using a suitable amine scavenger such as for example, benzoyl chloride or phosphoric acid. However, with both alternatives, reactants and conditions employed are chosen so as to preserve and not destroy the particulate polymer dispersion in the continuous phase, and provide an end product which is free of unreacted amine moieties.

Alternatively, the particulate polymer may be isolated by removing the continuous phase. The continuous phase may be removed, for example, by distillation, or preferably the particulate polymer may be collected by a filtration process and dried to give a powder. In this case, treatment of the continuous phase to remove or convert any residual starting material containing amino moieties or other functional groups is optional. The particulate polymer in powder form can then be used directly in the desired applications and, for example, redispersed in a continuous phase.

As already mentioned, in a third aspect this invention is a polymer matrix comprising urea and/or urethane linkages. This polymer has dispersed therein a discrete particulate polymer prepared by the process as described hereinabove.

The polymer matrices which are the third aspect of this invention contain the particulate polymer in sufficient quantity to improve their mechanical properties, such as, for example, impact strength and flexural modulus. Advantageously, the urethane/urea-comprising polymer contains the particulate polymer in from at least 0.1, preferably at least about 0.5, and more preferably at least about 1.0, and up to about 40, preferably up to about 25, more preferably up to about 20, and most preferably up to about 15 percent by weight of the total weight of the polymer matrix and particulate polymer present. If the percentage of particulate polymer in the urethane/urea-comprising polymer is outside these limits, the improvement in mechanical properties may not be realized and they may even be inferior.

The urea- and/or urethane-comprising polymer can be prepared by reacting a polymer composition as described in the first aspect of this invention with an organic polyisocyanate when the continuous phase of the polymer composition comprises a polyahl. Alternatively, the polymer may be prepared by reacting a polymer composition with a polyahl when the continuous phase of the polymer composition is an organic polyisocyanate.

The polymer described by the third aspect of this invention can be prepared by any of the processes suitable for reacting a polyahl with an organic polyisocyanate. Suitable processes are discussed in, for example, U.S. Pat. Nos. Re. 24,514; 3,821,130 and GB 1,534,258 which are herein incorporated by reference. Techniques and processes for preparing such polymers are also extensively discussed, along with optional additives that may be used, in the publication *Polyurethanes Chemistry and Technology*, Vols. I & II by J. H. Saunders and K. C. Frisch, published by R. E. Krieger Publishing Co., Inc. and incorporated herein by reference.

In summary, this invention describes a composition comprising a particulate polymer and a continuous phase, and a process for producing such a particulate polymer. The particulate polymer is characterized in that it contains a plurality of aminocarbonyl or aminothiocarbonyl groups. The particulate polymer can be produced as a stable dispersion in a continuous phase or can be isolated and recombined with a continuous phase to provide a stable dispersion.

Suitable compositions can be used to prepare, for example, polyurethane and/or polyurea polymers, where the presence of the particulate polymer functions as a reinforcing agent or filler. The polymers may be flexible or rigid polyurethane foams, castings, films, coatings, adhesives, elastomers or thermoplastics suitable for molding purposes with improved mechanical properties such as increased tensile strength and hardness.

ILLUSTRATIVE EMBODIMENTS

The following examples are illustrative of the present invention but are not to be construed as limiting the scope thereof. Unless stated otherwise, all parts and percentages are given by weight.

EXAMPLE 1

This example illustrates the preparation of a stable particulate polymer dispersion by a two-step procedure involving an intermediate product.

To a silanized glass reactor is added 800 parts of a continuous phase, or polyether polyol, Voranol ™ 4702 (an ethylene oxide/propylene oxide adduct of glycerine, equivalent weight about 1610 and primary hydroxyl content of 82 percent; sold by The Dow Chemical Company), 1.0 part of urea, 1.12 parts of hexamethylene-1,6-diamine and 16.0 parts of a stabilizing agent, an ethylene oxide/propylene oxide adduct of glycerine, hydroxyl equivalent weight about 1610 and primary hydroxyl content of 82 percent which has 30.6 percent of its hydroxyl groups converted to amine moieties). The reactor is purged with nitrogen and the mixture heated at about 140° C. to about 150° C. for about 18 to about 20 hours whilst continuously stirring. The resulting intermediate product is a turbid, grey liquid with a viscosity of about 1230 cps at 25° C.

To the intermediate product in the glass reactor is added a further 34 parts of urea and 65.6 parts of hexamethylene-1,6-diamine. The urea and diamine, as a mixture, are added to the reactor periodically, about every 30 minutes, in portions of about 7 to about 8 parts whilst continuously stirring and maintaining the temperature at about 140° C. to about 150° C. The contents of the reactor are stirred until titrometric analysis shows no change in amine concentration.

The resulting particulate polymer (polyurea) in the continuous phase is then treated with a further 4.0 parts of urea, and stirred for about 20 hours at about 140° C. to about 150° C. before purging the headspace of the reactor with nitrogen to remove any non-polymerized starting material and/or volatile products.

After purging, the particulate polymer and continuous phase are treated with 1.7 parts of benzoyl chloride, to give a finished product. On cooling, the finished product is a stable particulate polyurea dispersion which has a viscosity of about 2200 cps at 25° C., a particulate polymer content of about 9.1 percent by weight, with particle size ranges of about 1 to 10 microns.

EXAMPLE 2

This example illustrates the preparation of a stable particulate polymer dispersion by a one-step procedure. All reactants are charged in one procedure, with no intermediate product being isolated.

All conditions and subsequent procedures are as for Example 1.

Details of the polyamine, carbonyl-containing compound, continuous phase and stabilizing agent are given in Table I. The particulate polymer content, particle size, viscosity and hydroxyl number of the resulting stable particulate polymer dispersions are also given in Table I.

EXAMPLES 3 to 7

These examples illustrate the preparations of stable particulate polymer dispersions employing reactants at different concentrations. The products are prepared according to the procedure of Example 2.

Details of the polyamine, carbonyl-containing compound, continuous phase and stabilizing agent are given in Table I. The particulate polymer content, particle size, viscosity and hydroxyl number of the resulting stable particulate polymer dispersions are also given in Table I.

TABLE I

| Ex. | CPA[1] (pbw) | Polyamine (pbw) I[2] | Polyamine (pbw) II[3] | C=O[4] | Stabilizing Agent (pbw) A[5] | Stabilizing Agent (pbw) B[6] | Reaction Temp (°C.) | Reaction Time (hr) | % PPC[7] | APS[8] (μ) | Vis[9] (cps) | OH No.[10] |
|---|---|---|---|---|---|---|---|---|---|---|---|---|
| 2 | 270 | 15.0 | 15.0 | 9.86 | — | — | 175 | 22.5 | 10.5 | N.O. | 3410 | 31.3 |
| 3 | 270 | 13.5 | 13.5 | 8.89 | 3.0 | — | 175 | 21.5 | 7.7 | 5 | 1776 | 32.3 |
| 4 | 270 | 6.0 | 18.0 | 5.67 | 6.0 | — | 175 | 22.0 | 9.1 | 5 | 2188 | 31.8 |
| 5 | 270 | 27.0 | — | 13.97 | 3.0 | — | 175 | 24.0 | 5.1 | 5 | 1180 | 33.2 |
| 6 | 225 | 30.0 | 30.0 | 19.80 | 15.0 | — | 175 | 22.0 | 24.2 | N.O. | 21100 | 26.5 |
| 7 | 308 | 15.4 | 15.4 | 10.18 | — | 3.43 | 175 | 27.0 | 8.5 | N.O. | 2204 | 32.0 |

[1] Continuous Phase A is an ethylene oxide/propylene oxide adduct of glycerine; OH No. 35, primary OH 82 percent
[2] Polyamine I is hexamethylene-1,6-diamine
[3] Polyamine II is Jeffamine D-400 sold by Texaco (an aminated polypropylene glycol)
[4] C=O, carbonyl-containing compound, for Examples 2 to 7, urea
[5] An ethylene oxide/propylene oxide adduct of glycerine; OH No. 35, primary Oh 82 percent which is partially aminated, 30.6 percent of hydroxyl groups converted to amine moieties
[6] Jeffamine M-2005 sold by Texaco (am aminated 2-methoxyethanol-initiated propylene oxide adduct, molecular weight 2000)
[7] Particulate polymer content of dispersion, percent by weight
[8] Average particle size - N.O. - Not observed
[9] Viscosity
[10] Hydroxyl number

EXAMPLE 8

Isolation and Redispersion of a Particulate Polymer in a Polyether Polyol

To 160 parts of the particulate polyurea dispersion obtained in Example 1 is added 500 parts of a mixture consisting of 70 volume percent isooctane and 30 volume percent toluene. The resulting slurry is stirred and then filtered using a suitable fine porosity glass filter and the particulate polyurea isolated.

The particulate polyurea is washed several times with the mixture to remove all traces of the continuous phase and then dried in a vacuum oven for about 16 hours at 120° C./<1 mm Hg to give a white powder.

A new polyurea dispersion is prepared by dispersing 15 parts of the isolated white powder in 60 parts of a continuous phase, a polyether polyol, Voranol ™ 4702 sold by The Dow Chemical Company.

The resulting stable polyurea dispersion prepared in this manner has a particulate polymer content of 20 percent by weight and an equivalent weight of 2040.

EXAMPLE 9 and 10

Examples 9 and 10 are polymers containing urethane and/or urea linkages, prepared with the stable particulate dispersions of Examples 1 and 8, respectively.

which $E' = 10$ psi), and the increase is more than that observed when extra hard segment is added.

This example illustrates the properties to be obtained for a polymer matrix comprising the particulate polymer of the invention compared to a polymer matrix where it is necessary to modify substantially the components used in preparing the matrix to achieve the same performance.

TABLE II

| | Elastomer Formulations | | | | | | | |
|---|---|---|---|---|---|---|---|---|
| Sample | Parts Voranol® 4702 [1] | Parts Dispersion | Parts 1,4-BDO [2] | Parts Isonate® 143LM [3] | Parts DBTDL [4] | Wt % Hard Segment | Wt % Polyurea Solids | Wt % Total Reinforcement |
| A° | 70 | — | 5.46 | 24.54 | 0.009 | 30 | 0 | 30 |
| 9 | — | 70 [5] | 5.46 | 23.97 | 0.007 | 30 | 6 | 36 |
| B° | 64 | — | 6.97 | 29.03 | 0.011 | 36 | 0 | 36 |
| 10 | — | 70 [6] | 5.70 | 24.25 | 0.006 | 30 | 14 | 44 |
| C° | 56 | — | 8.99 | 35.01 | 0.005 | 44 | 0 | 44 |

°Not an example of this invention
[1] Equivalent weight = 1635 g/eq
[2] 1,4-Butanediol
[3] Mixture of methylene-bis(4-phenylisocyanate) and polycarbodiimide products sold by the Dow Chemical Company
[4] Dibutyltin dilaurate
[5] Particulate polymer dispersion of Example 1
[6] Particulate polymer dispersion of Example 8

TABLE III

| | | | Physical properties of Polyurethane Elastomers | | | | |
|---|---|---|---|---|---|---|---|
| Sample | Tan Delta Peak (°C.) | Temp @ E' = 10 psi | $E' \times 10^3$ psi | | | | |
| | | | −125° C. | 25° C. | 100° C. | 125° C. | 150° C. |
| A° | −34 | 164 | 536 | 2.72 | — | 0.59 | — |
| 9 | −33 | 188 | 527 | 7.76 | 4.31 | 2.20 | 0.720 |
| B° | −32 | 175 | 593 | 6.46 | 3.08 | 1.24 | — |
| 10 | −41 | 194 | 535 | 19.4 | 10.1 | 7.55 | 4.44 |
| C° | −33 | 179 | 542 | 12.6 | 5.93 | 4.23 | 2.29 |

°Not an example of this invention.

The polymers prepared are plaques of 4"×4"×0.125" prepared according to the following procedure, with the formulations given in Table II.

All components are degassed separately under vacuum, then mixed together in a common container in the amounts specified in Table II. The mixture is vigorously stirred with a mechanical mixer for 10 to 30 seconds and then poured into an ambient temperature steel plaque mold whose surfaces have been treated with a teflon-based mold release agent. The mold is closed, bolted shut, and placed in a suitable oven at 120° C. for about 2.5 hours. After cooling to room temperature the part is removed from the mold, and its physical properties observed.

The modulus properties are summarized in Table III. Sample A is a control, containing a theoretical 30 percent (wt/wt) hard segment. Samples 9 and 10 show the effect of adding 6 percent and 14 percent (wt/wt) polyurea solids, respectively, to this base elastomer. Samples B and C are controls which show the effect of adding 6 percent and 14 percent (wt/wt) hard segment to the base elastomer (Example A).

The soft segment glass transition temperature and flexural storage modulus in the glassy region (E' at −125° C.) are unaffected by any of the changes. Samples B and D show a definite increase in plateau modulus when the polyurea solids are added, and this increase is greater than that observed when extra hard segment is added, as in Samples B and C. Likewise, the rubbery plateau is extended to higher temperatures when the polyurea solids ar present (temperature at The following examples illustrate the use of different carbonyl-containing compounds, polyamines and continuous phase for preparing the particulate polymer and dispersion thereof.

EXAMPLE 11

A Particulate Polymer Composition Where the Particulate Polymer is Prepared from Urea and Bis(4-aminophenyl)methane To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.16 part of urea, 0.24 part of bis(4-aminophenyl)methane, and 2.0 parts of an aminated polyether polyol (an ethylene oxide/propylene adduct of glycerine, hydroxyl equivalent weight about 1610 and primary hydroxyl content of 82 percent which has been partially aminated so that 30.6 percent of its hydroxyl groups is converted to amine moieties). The reactor is purged with nitrogen and the mixture is heated from about 140° C. to about 150° C. for about 18 to about 20 hours whilst continuously stirring. The resulting intermediate product is a transparent, light orange liquid with a viscosity of about 940 cps at 25° C.

To the intermediate product in the reactor is added further 2.72 parts of urea and 8.86 parts of bis(4-aminophenyl)methane. The urea and diamine are added to the reactor periodically as a mixture, about every 45 minutes, in portions of about 1.5 parts by weight while continuously stirring and maintaining the temperature at about 140° C. to about 150° C. The contents of the reactor are stirred continuously until titrometric analysis shows that the amine concentration is constant, in this case about 21 hours.

The resulting particulate polymer (polyurea) in the continuous phase is then treated with a further 1.0 part of urea, and stirred for about 40 hours at about 140° C. to about 150° C.

On cooling, the finished product is a stable particulate polyurea dispersion which has a viscosity of about 3300 cps at 25° C. The particulate polymer content is about 9.1 percent, with particle sizes ranging from about 0.1 to about 15 microns.

EXAMPLE 12

A Particulate Polymer Composition Where the Particulate Polymer is Prepared from Biuret and Bis(4-aminophenyl)methane To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent, sold by The Dow Chemical Company), 0.25 part of biuret, 0.24 part of bis(4-aminophenyl)methane, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for about 18 to about 20 hours while continuously stirring. The resulting intermediate product is a transparent light orange liquid with a viscosity of about 1040 cps at 25° C.

To the intermediate product in the reactor is added further 3.85 parts of biuret and 7.41 parts of bis(4-aminophenyl)methane. The biuret and diamine are added, as a mixture, to the reactor periodically, about every 45 minutes, in portions of about 1.5 parts by weight while continuously stirring and maintaining the temperature at about 140° C. to about 150° C. The contents of the reactor are stirred continuously until titrometric analysis shows that the amine concentration is constant, in this case about 60 hours.

On cooling, the finished product is a stable particulate polybiuret dispersion which has a viscosity of about 3600 cps at 25° C. The particulate polymer content is about 9.1 percent, with particle sizes ranging from about 0.1 to about 25 microns.

EXAMPLE 13

A Particulate Polymer Composition Where the Particulate Polymer is Prepared in a Different Continuous Phase To a reactor is added 100 parts of a continuous phase, a polyether polyol, VORANOL TM 5287 (an ethylene oxide/propylene oxide adduct of propylene glycol, equivalent weight about 1000; sold by The Dow Chemical Company), 0.14 part of urea, 0.15 part of hexamethylene-1,6-diamine, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for about 18 to about 20 hours while continuously stirring. The resulting intermediate product is a turbid gray liquid.

To the intermediate product in the reactor is added further 4.29 parts of urea and 8.28 parts of hexamethylene-1,6-diamine. The urea and diamine are added, as a mixture, to the reactor periodically, about every 45 minutes, in portions of about 1.33 parts by weight while continuously stirring and maintaining the temperature at about 140° C. to about 150° C. The contents of the reactor are stirred continuously until titrometric analysis shows that the amine concentration is constant, in this case about 21 hours. The resulting particulate polymer (polyurea) in the continuous phase is then heated with a further 0.51 part urea, and stirred for about 15 hours at about 140° C. to 150° C.

On cooling, the finished product is a stable particulate polyurea dispersion which has a viscosity of about 1170 cps at 25° C. The particulate polymer content is about 9.1 percent, with particle sizes ranging from about 0.1 to about 25 microns.

EXAMPLE 14

Example of Redispersion of a Particulate Polymer in a Polyester Polyol

To 100 parts of the particulate polyurea dispersion obtained in Example 1 is added 225 parts of a mixture consisting of 70 volume percent isooctane and 30 volume percent toluene. The resulting dispersion is stirred and then filtered using a suitable fine porosity glass filter and the particulate polyurea isolated.

The particulate polyurea is washed several times with the solvent mixture to remove all traces of the continuous and then dried in a vacuum oven for 16 hours at 120° C./<1 mm Hg to give a white powder.

A new polyurea dispersion is prepared by dispersing 10 parts of the isolated white powder in 90 parts of a continuous phase, Formrez 11-56 (a polyester polyol made by Witco Corporation: the reaction product of diethylene glycol and adipic acid, equivalent weight about 1000).

The resulting stable polyurea dispersion prepared in this manner has a particulate polymer content of 10 percent by weight, viscosity of 30,000 cps at 25° C. and an equivalent weight of about 1100 g/eq OH.

EXAMPLE 15

Preparation of a Particulate Polymer from Thiourea and Hexamethylene-1,6-diamine To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.19 part of thiourea, 0.13 part of hexamethylene-1,6-diamine, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for about 18 to about 20 hours while continuously stirring. The resulting intermediate product is a transparent, light orange liquid with a viscosity of about 840 cps at 25° C.

To the intermediate product in the reactor is added further 4.81 parts of thiourea and 7.38 parts of hexamethylene-1,6-diamine. The urea and diamine, as a mixture, are added to the reactor periodically, about every 45 minutes, in portions of about 2.0 parts by weight while continuously stirring and maintaining the temperature at about 140° C. to about 150° C. The contents of the reactor are stirred constantly, until titrometric analysis shows that the amine concentration is constant, in this case about 19 hours.

On cooling, the finished product is a transparent yellow liquid which has a viscosity of about 3700 cps at 25° C. The polymer content is 9.1 percent. On heating to above about 65° C., the product is an opaque white liquid, a dispersion of poly(hexamethylene thiourea), which has a viscosity of about 150 cps at 75° C.

EXAMPLE 16

Example of a Particulate Polymer Composition Containing 5 Percent by Weight Particulate Polymer Prepared in situ from Urea and Bis(4-aminophenyl) methane To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.07 part of urea, 0.10 part of bis(4-aminophenyl)methane, and 0.91 part of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for about 4 to 8 hours while continuously stirring. The resulting intermediate product is a transparent, light orange liquid.

To the intermediate product in the reactor is added further 1.33 parts of urea and 4.42 parts of bis(4-aminophenyl)methane. The urea and diamine are added to the reactor periodically, about every 30 minutes, in portions of about 0.7 part while continuously stirring and maintaining the temperature at about 140° C. to about 150° C. The contents of the reactor are stirred continuously for about 18 hours.

On cooling, the finished product is a stable particulate polyurea dispersion which has a viscosity of about 2000 cps at 25° C. The particulate polymer content is about 4.8 percent, with particle sizes ranging from about 0.1 to about 15 microns.

EXAMPLE 17

Preparation of a Particulate Polymer Composition Where the Particulate Polymer is Prepared from Urea and Hexamethylene-1,6-diamine in the Presence of a Stabilizer, Jeffamine TM M-2005

To a reactor is added 100 parts of a continuous phase, a polyether polyol, VORANOL ® 4702 (an ethylene oxide/propylene oxide adduct of glycerine, equivalent weight about 1610 and primary hydroxyl content of 82.0 percent sold by The Dow Chemical Company), 0.15 part of urea, 0.16 part of hexamethylene-1,6-diamine, and 0.50 part of Jeffamine TM M-2005 (an ethylene oxide/propylene oxide adduct of 2-methoxyethanol, molecular weight about 2000, which has been aminated so that its hydroxyl groups are converted to amine moieties, sold by Texaco Chemical Company). The reactor is purged with nitrogen and the mixture is heated from about 140° C. to about 150° C. for about 18 to about 26 hours while continuously stirring. The resulting intermediate product is a turbid gray liquid with a viscosity of 970 cps.

To the intermediate product in the reactor is added further 4.29 parts of urea and 8.22 parts of hexamethylene-1,6-diamine. The urea and diamine are added to the reactor periodically, about every 45 minutes, in portions of about 1.33 parts while continuously stirring and maintaining the temperature at about 140° C. to about 150° C. The contents of the reactor are stirred continuously until titrometric analysis shows that the amine concentration is constant, in this case about 33 hours. The resulting particulate polymer (polyurea) in the continuous phase is then treated with a further 0.43 part of urea, and stirred for about 23 hours at about 140° C. to 150° C. before purging the headspace with nitrogen to remove any non-polymerized starting materials and/or volatile products.

On cooling, the finished product is a stable particulate polyurea dispersion which has a viscosity of about 2400 cps at 25° C. The particulate polymer content is about 9.1 percent, with particle sizes ranging from about 0.1 to about 25 microns.

EXAMPLE 18

A Particulate Polymer Composition Wherein the Particulate Polymer is Prepared from 1,3-Diethylurea and Hexamethylene-1,6-diamine To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.16 part of urea, 0.16 part of hexamethylene-1,6-diamine, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for 18 to about 26 hours while continuously stirring. The resulting intermediate product is a turbid gray liquid.

To the intermediate product in the reactor is added further 8.21 parts of 1,3-diethylurea and 8.17 parts of hexamethylene-1,6-diamine. The urea and diamine are added to the reactor periodically, about every 45 minutes, in portions of about 1.8 parts while continuously stirring and maintaining the temperature at about 140° C. to about 150° C. The contents of the reactor are stirred continuously until titrometric analysis shows that the amine concentration is constant, in this case about 33 hours. The resulting particulate polymer (polyurea) in the continuous phase is then treated with a further 1.23 parts of 1,3-diethylurea, and stirred for about 23 hours at about 140° C. to 150° C. before purging the headspace with nitrogen to remove any non-polymerized starting materials and/or volatile products.

On cooling, the finished product is a stable particulate polyurea dispersion which has a viscosity of about 2900 cps at 25° C. The particulate polymer content is about 9.1 percent, with particle sizes ranging from about 0.1 to about 25 microns.

What is claimed is:

1. A stable dispersion of (b) in (a) which comprises
   (a) a continuous phase: and
   (b) from about 0.1 to about 50 weight percent by total weight of (a) and (b) of a discrete particulate polymer which has an average particle size of about 30 microns or less,
   characterized in that (b) is a product containing a plurality of aminocarbonyl moieties or aminothiocarbonyl moieties which is the result of a reaction that comprises contacting
   (c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and
   (d) one or more polyamines.

2. The stable dispersion of claim 1 wherein the continuous phase is a liquid.

3. The stable dispersion of claim 2 wherein the liquid comprises a polyether polyol, a polyester polyol, a polycarbonate polyol, or mixtures thereof.

4. The stable dispersion of claim 3 wherein the liquid is a polyether polyol having from nominally about two to about eight isocyanate-reactive hydrogen atoms per molecule and an equivalent weight of from about 100 to about 4000.

5. The stable dispersion of claim 4 wherein the polyether polyol has from nominally about two to about four isocyanate-reactive hydrogens per molecule and an equivalent weight of from about 500 to about 2500.

6. The stable dispersion of claim 2 wherein the particulate polymer has an average particle size of about 25.0 microns or less.

7. The stable dispersion of claim 2 wherein the carbonyl-containing compound is one or more selected from the group consisting of a urea compound, a biuret compound, a polycarboxylic acid compound or its esters or anhydrides, and a polycarboxylic acid chloride.

8. The stable dispersion of claim 2 wherein the polyamine comprises an aliphatic amine, an araliphatic amine, a cycloaliphatic amine, an aromatic amine, or a polyaminated polyether polyol, or mixtures thereof.

9. The stable dispersion of claim 8 wherein the polyamine is a diamine and comprises a $C_{4-12}$ aliphatic diamine, an aromatic diamine, a diaminated polyether polyol, or mixtures thereof.

10. The stable dispersion of claim 9 wherein the diaminated polyether polyol has a molecular weight of at least 100.

11. The stable dispersion of claim 9 wherein the $C_{4-12}$ aliphatic diamine comprises butylene diamine, hexamethylene diamine, dodecamethylene diamine or mixtures thereof.

12. The stable dispersion of claim 9 wherein the aromatic amine comprises methylene diphenylamine, toluenediamine, or mixtures thereof.

13. The stable dispersion of claim 5 wherein the particulate polymer is prepared by contacting a carbonyl-containing compound which is urea with a polyamine which comprises hexamethylenediamine.

14. The stable dispersion of claim 1 wherein a stabilizing agent is present.

15. A process for preparing a particulate polymer containing a plurality of aminocarbonyl moieties or aminothiocarbonyl moieties that comprises contacting
   (c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and
   (d) one or more polyamines
at an elevated temperature sufficient to cause the polymerization of (c) and (d) to form the particulate polymer, in a continuous phase in which the particulate polymer is insoluble.

16. The process of claim 15 wherein the continuous phase comprises a polyether polyol, a polyester polyol, a polycarbonate polyol, an aromatic hydrocarbon, an aromatic ether, or mixtures thereof.

17. The process of claim 16 wherein the continuous phase contains a stabilizing agent in an amount sufficient to provide the particulate polymer as a stable dispersion in the continuous phase.

18. The process of claim 17 wherein the stabilizing agent is a monoamine or monocarboxylic acid compound.

19. The process of claim 18 wherein the stabilizing agent has a molecular weight of at least 400.

20. The process of claim 15 wherein the particulate polymer is prepared at a temperature of at least 50° C.

21. The process of claim 15 wherein the particulate polymer has a particle size of about 30 microns or less.

22. The process of claim 21 further comprising isolating the particulate polymer by removing the continuous phase.

23. A polymer matrix comprising urea and/or urethane linkages which is the product of a reaction that comprises contacting an organic polyisocyanate with an active hydrogen-containing compound characterized in that matrix has dispersed therein a discrete particulate polymer which has an average particle size of from about 30 microns or less and wherein said particulate polymer is a product containing a plurality of aminocarbonyl moieties or aminothiocarbonyl moieties and wherein said particulate polymer is the result of a reaction that comprises contacting
   (c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and
   (d) one or more polyamines.

* * * * *